United States Patent [19]

Ikegaya et al.

[11] Patent Number: 5,148,384
[45] Date of Patent: Sep. 15, 1992

[54] SIGNAL PROCESSING INTEGRATED CIRCUIT

[75] Inventors: Yuji Ikegaya; Shinichi Sakai; Yuji Kakubo; Yusuke Konagai, all of Hamamatsu, Japan

[73] Assignee: Yamaha Corporation, Hamamatsu, Japan

[21] Appl. No.: 561,914

[22] Filed: Aug. 2, 1990

[30] Foreign Application Priority Data

Aug. 4, 1989 [JP] Japan ................................. 1-202634

[51] Int. Cl.$^5$ ........................................... G06F 15/336
[52] U.S. Cl. ................................................ 364/728.01
[58] Field of Search ......... 364/728.01, 724.15–724.17, 364/724.19

[56] References Cited

U.S. PATENT DOCUMENTS

| | | | |
|---|---|---|---|
| 4,489,393 | 12/1984 | Kawahara et al. | 364/728.01 |
| 4,811,259 | 3/1989 | Costas | 364/724.16 |
| 4,821,223 | 4/1989 | David | 364/724.05 |

*Primary Examiner*—Tan V. Mai
*Attorney, Agent, or Firm*—Spensley Horn Jubas & Lubitz

[57] ABSTRACT

A signal processing large scale integrated circuit for carrying out convolution calculations includes multiple delay stages serially connected to thereby form an input data path for a first input signal, a first calculation circuit wherein predetermined calculations are carried out using the output of each of the above mentioned delay stages and a second calculation circuit connected to a convolution path wherein predetermined calculations are carried out using the output of the above mentioned first calculation circuit and a second input signal output from another large scale integrated circuit. The problem of a prolonged delay when multiple LSI circuits are cascade-connected together is eliminated by outputting the first output signal from an intermediate delay element and supplying it as the input to the next stage large scale integrated circuit. Additionally, the direction of the input data path and the convolution path are reverse with respect to one another, so that the value calculated in the first calculation circuit in the first circuit is calculated using the output from the following stage circuit. As a result, the total delay of the cascade-connected circuits is equivalent to the delay of the first circuit in the cascade.

4 Claims, 4 Drawing Sheets

SIGNAL PROCESSING INTEGRATED CIRCUIT

BACKGROUND OF THE INVENTION

1. Field of the Invention

The present invention pertains to integrated signal processing circuits suitable for application to circuits for carrying out convolution calculations.

2. Related Art

Figure 3:
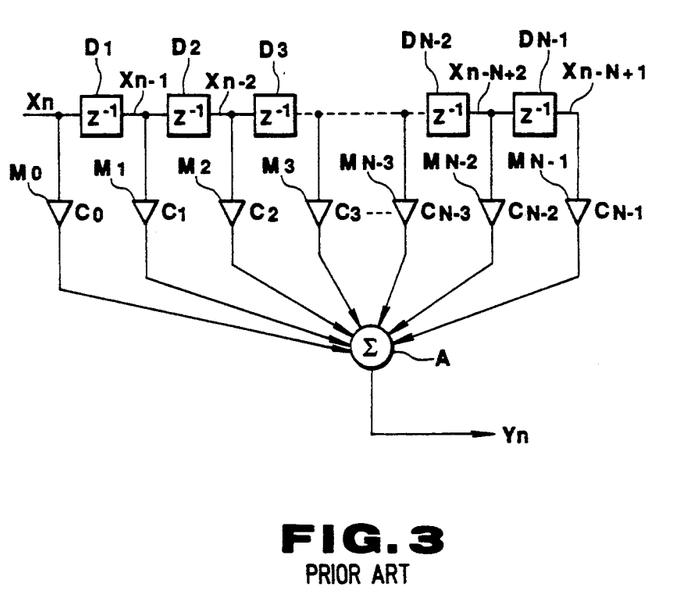
FIG. 3 is a block diagram illustrating the structure of a conventional general purpose convolution calculation circuit.

Convolution calculation circuits are often employed in devices such as digital audio equipment wherein various types of filtering operations are applied to an audio signal, including equalization, reverberation effect processing and the like. As an example of this kind of circuit, a block diagram illustrating the fundamental makeup of an N stage convolution calculation circuit is shown in FIG. 3, where N is an integral value. In the illustrated circuit, a digital signal is input periodically at a sampling cycle length given by $\tau$, whereupon the supplied signal is sequentially delayed in serially connected delay circuits $D_1, D_2, \ldots D_{N-1}$. The above mentioned delay circuits $D_1, D_2, \ldots D_{N-1}$ comprise registers, where each respective register is of a fixed bit width. To each of these registers, a clock pulse is supplied periodically at the above mentioned sampling cycle length $\tau$. Accordingly, at the point in time when sample signal $X_n$ is input to delay circuit $D_1$, the sample signal output from delay circuit $D_1$ at that point in time is sample signal $X_{n-1}$ which was input at a point time $\tau$ previously, the sample signal output from delay circuit $D_2$ when sample signal $X_n$ is input to delay circuit $D_1$ is sample signal $X_{n-2}$ which was input at a point in time $2\tau$ previously, and the sample signal output from delay circuit $D_{N-1}$ when sample signal $X_n$ is input to delay circuit $D_1$ is sample signal $X_{n-N-1}$ which was input at a point in time $(N-1)\tau$ previously. Input signal Xn, as well as the output signal $X_{n-1}, X_{n-2}, \ldots N_{n-N+}$ of each delay circuit $D_1, D_2, \ldots D_{N-1}$, respectively, are each provided to a respective multiplier circuit $M_0, M_1, \ldots M_{N-1}$, wherein each supplied signal is multiplied by a corresponding multiplication coefficient $C_0, C_1, \ldots C_{N-1}$, the output of each multiplication then being supplied to adder A wherein the result of all of the multiplication operations are added together. In this way, within the described convolution calculation circuit, a plurality of convolution calculations are carried out, after which the results of all of the calculations are summed in adder A, the result of which is output as digital data $Y_n$. This operation is mathematically expressed in Equ. 1 below:

$$Y_n = \sum_{k=0}^{N-1} C_k \cdot X_{n-k} \quad \text{Equ. 1}$$

When an attempt is made to implement the above described convolution calculation circuit with a great number of convolution calculations using LSI (large scale integration) techniques, the total number of components inevitably becomes unmanageably large, thus making such an implementation in a single LSI integrated circuit quite difficult from a practical point of view.

Methods exist for applying LSI techniques to convolution calculation circuits having a great number of calculation stages, wherein two or more signal processing LSI integrated circuits are fabricated, each integrated circuit corresponding to a continuous series of calculation stages. With such an implementation, the entire series of delay stages over which the convolution calculations occur is divided into two or more continuous blocks along the time axis with respect to time delay. The calculations of each of these blocks are allocated to a corresponding one of the above mentioned signal processing LSI integrated circuits. By cascade connecting the signal processing LSI integrated circuits, the entire convolution calculation circuit is formed.

Figure 4:
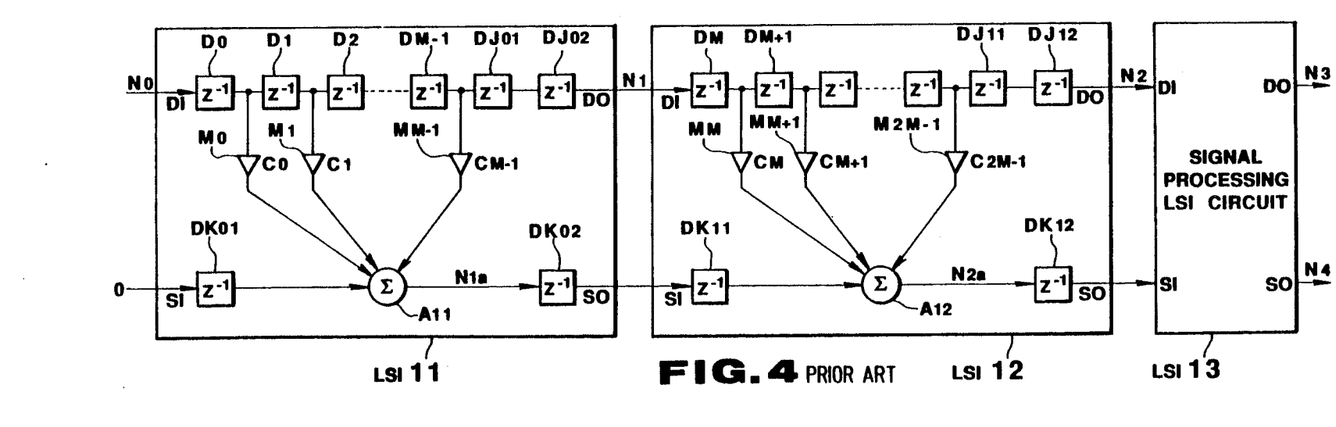
FIG. 4 is a block diagram illustrating the composite structure of a calculation circuit in which three conventional convolution calculation circuits have been cascade connected together.

In FIG. 4, an example of this kind of convolution calculation circuit is shown. The illustrated circuit is made up of three signal processing LSI integrated circuits LSI 11, LSI 12 and LSI 13, each having M convolution calculation stages, where M is an integral value, thus comprising 3M convolution calculation stages for the circuit as a whole. All elements in FIG. 4 corresponding to elements in the circuit of FIG. 3 described above will retain the original identifying numeral.

To describe an example of the operation of the circuit shown in FIG. 4, when a signal is input at input port DI of signal processing LSI integrated circuit LSI 11, it first passes through delay circuit $D_0$ where it is delayed by a single sampling interval $\tau$, after which it then passes successively through each of the delay circuits $D_1, D_2, \ldots D_{N-1}$, as well as through multiplier circuits $M_0, M_1$, to then be summed in adder $A_{11}$, just as was described above for the circuit of FIG. 3.

In the circuit presently under discussion, delay circuit $D_0$ acts as an interface and provides an initial delay for the sampling signal after it passes through input port DI. In the same way, delay circuits $DJ_{01}, DJ_{02}, DK_{01}$, and $DK_{02}$ act to delay incoming and outgoing data for signal processing LSI integrated circuit LSI 11.

In addition to the results of each of the multiplication operations carried out in multiplication circuits $M_0, M_1, \ldots M_{M-1}$, adder $A_{11}$ also includes in the calculated sum any signal provided to convolution calculation result input port SI after first passing through delay circuit $DK_{01}$ where the input signal is first delayed by a single sampling interval $\tau$ before it is supplied to adder $A_{11}$. In the case of signal processing LSI integrated circuit LSI 11, no signal is supplied to convolution calculation result input port SI since it is the first signal processing circuit in the cascade. The result of the addition operation output from adder $A_{11}$ is then supplied to delay circuit $DK_{02}$ where the input signal is first delayed by a single sampling interval $\tau$, after which it is output at convolution calculation result output port SO as the result of the convolution calculations carried out in signal processing LSI integrated circuit LSI 11. Thus output, the signal is then supplied to convolution calculation result input port SI of signal processing LSI integrated circuit LSI 12, the next integrated circuit in the cascade. The signal thus supplied to convolution calculation result input port SI of signal processing LSI integrated circuit LSI 12 is then further delayed in delay circuit $DK_{11}$ by a single sampling interval $\tau$.

On the other hand, the output signal from delay circuit $D_{M-1}$ is signal processing LSI integrated circuit LSI 11 passes through delay circuits $DJ_{01}$ and $DJ_{02}$ thereby causing it to be delayed by two sampling intervals $\tau$ before being output at delayed signal output port DO. From delayed signal output port DO, the signal is supplied to the following signal processing stage, signal processing LSI integrated circuit LSI 12 via calculation result input port SI. As described above, in signal processing LSI integrated circuit LSI 11, the sum of the delay intervals in delay circuits $DJ_{01}$ and $DJ_{02}$ and the sum of the delay intervals in delay circuits $DK_{01}$ and $DK_{02}$ are equal. In this way, the phase of the delayed sampling signal supplied from signal processing LSI integrated circuit LSI 11 to signal processing LSI integrated circuit LSI 12 remains synchronized with the phase of the result of the convolution calculations.

Signal processing LSI integrated circuit LSI 12 which is connected with the last stage of signal processing LSI integrated circuit LSI 11 is of an analogous structure to signal processing LSI integrated circuit LSI 11. However, in the case of signal processing LSI integrated circuit LSI 12, the multiplication coefficients by which each successively delayed sampling signal is multiplied are designated as multiplication coefficients $C_M, C_{M+1}, \ldots C_{2M-1}$. Thus, in signal processing LSI integrated circuit LSI 12, the signal input at calculation result input port SI from signal processing LSI integrated circuit LSI 11 is successively delayed in delay circuits $D_M, D_{M+1}, \ldots D_{2M-1}$, and each successively delayed signal is multiplied in a respective multiplication circuit $M_M, M_{M+1}, \ldots M_{2M-1}$ by a corresponding multiplication coefficient $C_M, C_{M+1}, \ldots C_{2M-1}$, just as described for signal processing LSI integrated circuit LSI 11 above. The results of these multiplication operations are then summed in adder $A_{12}$, along with the first stage convolution calculation signal input at calculation result input port SI after it has been delayed in delay circuit $DK_{11}$. The result of this addition operation is then output at calculation result output port SO after first being delayed by a single sampling interval $\tau$ in delay circuit $DK_{12}$. Thus having undergone convolution calculations in signal processing LSI integrated circuit LSI 11 and LSI 12, the signal output from calculation result output port SO of signal processing LSI integrated circuit LSI 12 is supplied to the calculation result input port SI of the following signal processing stage, signal processing LSI integrated circuit LSI 13. In the present example, the structure of signal processing LSI integrated circuit LSI 13 is analogous to that of the previously described signal processing LSI integrated circuits LSI 11 and LSI 12.

Figure 5:
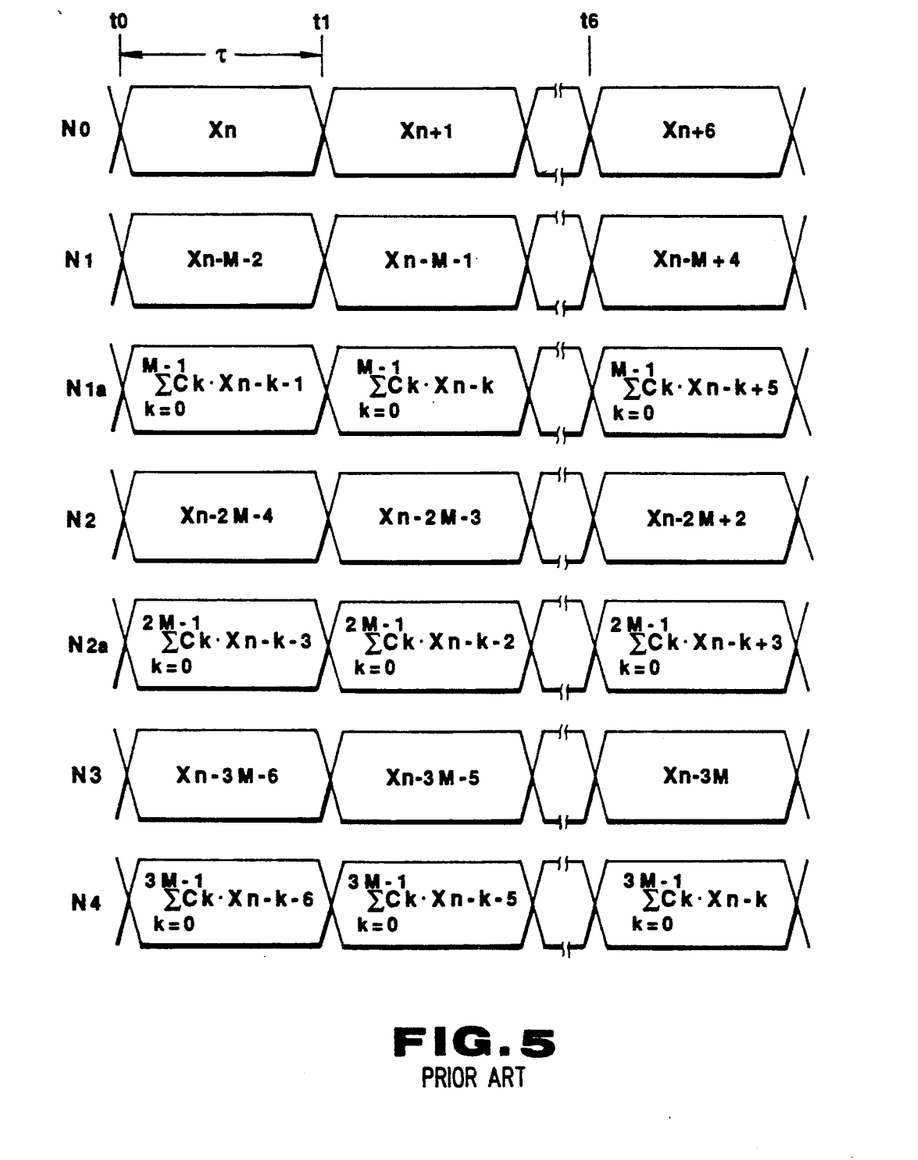
FIG. 5 is a time chart illustrating the operation of the conventional signal processing LSI integrated circuit shown in FIG. 4.

In the following, with reference to FIG. 5, the operation of this conventional convolution calculation circuit will be described. At a given point in time $t_0$, a sample signal $X_n$ is supplied to input port DI (node $N_0$) of the first stage signal processing circuit, signal processing LSI integrated circuit LSI 11. Because the sample signal output from signal processing LSI integrated circuit LSI 11 at delayed signal port DO (node 1) at time $t_0$ has traversed M+2 delay circuits, this signal is sample signal $X_{n-M-2}$ which was input at input port DI (node $N_0$) at a point in time $(M+2)\tau$ earlier than time $t_0$. In the same way, because the sample signals output from signal processing LSI integrated circuits LSI 12 and LSI 13 at their respective delayed signal output ports DO (nodes $N_2$ and $N_3$ respectively) have traversed M+2 delay circuits in each of these integrated circuits, at time $t_0$, the signal at node $N_2$ is sample signal $X_{n-2M-4}$, and that at node $N_3$ is sample signal $X_{n-3M-6}$.

At time $t_0$, sample signals $X_{n-1}, X_n, \ldots X_{n-M}$ are output from delay circuits $D_0, D_1, \ldots D_{M-1}$, respectively, and their aggregate sum is determined in adder $A_{11}$. Accordingly, at time $t_0$, the signal value at node $N_{1a}$ is given by Equ. 2 below:

$$\sum_{k=0}^{M-1} C_k \cdot X_{n-k-1} \quad \text{Equ. 2}$$

Since two delay circuits are interposed in the connection between adders $A_{11}$ and $A_{12}$, the signal supplied to adder $A_{12}$ from adder $A_{11}$ at time $t_0$ is the signal output from adder $A_{11}$ at a point in time $2\tau$ earlier than time $t_0$, the value of which is given by Equ. 3 below:

$$\sum_{k=0}^{M-1} C_k \cdot X_{n-k-3} \quad \text{Equ. 3}$$

Sample signals $X_{n-M-3}, X_{n-M-2}, \ldots X_{n-2M-2}$ are output from delay circuits $D_M, D_{M+1}, \ldots D_{2M-1}$, respectively, at time $t_0$. Thus, the value of the signal present at node $N_{2a}$ at time $t_0$, which is the result of adding the results obtained by multiplying each of sample signals $X_{n-M-3}, X_{n-M-2}, \ldots X_{n-2M-2}$ by a respective multiplication coefficient in a respective multiplication circuit, and additionally adding the signal supplied from adder $A_{11}$ in adder $A_{12}$, is given by Equ. 4 below:

$$\sum_{k=0}^{M-1} C_k \cdot X_{n-k-3} + \sum_{k=M}^{2M-1} C_k \cdot X_{n-k-3} = \sum_{k=0}^{2M-1} C_k \cdot X_{n-k-3} \quad \text{Equ. 4}$$

The result of the convolution calculations carried out in signal processing LSI integrated circuit LSI 12, as given by Equ. 4 above, is then employed in the convolution calculations carried out in the following stage, signal processing LSI integrated circuit LSI 13 after having been delayed by two sampling intervals $\tau$. After undergoing further convolution calculation processing in signal processing LSI integrated circuit LSI 13, which is analogous to that described for signal processing LSI integrated circuits LSI 11 and LSI 12, the final result of the convolution calculations over the three stages is output at calculation result output port SO of signal processing LSI integrated circuit LSI 13 after having been delayed by an additional sampling interval $\tau$. Thus, the value of the signal at node $N_4$ at time $t_0$ is given by Equ. 5 below:

$$\sum_{k=0}^{3M-1} C_k \cdot X_{n-k-6} \quad \text{Equ. 5}$$

It can therefore be seen that at time $t_0$, the convolution calculation result output at node $N_4$ represents the result of convolution calculations involving 3M sample signals from sample signal $X_{n-6}$ which was input a point in time $6\tau$ prior to time $t_0$ and all sample signals input up to and including sample signal $X_n$ input at time time $t_0$. Accordingly, and as is shown in FIG. 5, when a sample signal $X_n$ is input into the conventional convolution calculation circuit shown in FIG. 4 at time $t_0$, at time $t_6$ six sampling intervals $\tau$ after time $t_0$, the result of convolution calculations involving sample signals $X_n$, $X_{n-1}, \ldots X_{n-3M+1}$ is output at node N4.

In the above description where three integrated circuits are cascade connected, to further expand the system by adding fourth and fifth stages, the number of delay circuits which a signal must traverse and which are not directly involved in the convolution calculations (for example, delay circuits $DK_{01}$ and $DK_{02}$ in signal processing LSI integrated circuit LSI 11) increases in proportion to the number of calculation stages. Thus, in conventional convolution calculation circuits in which two or more signal processing LSI integrated circuits are cascade connected, with each added signal processing LSI integrated circuit, the amount of time which is required for signals to pass through delay elements not directly involved in the convolution calculations increases. For this reason, the elapsed time between when a signal is input and when calculation results involving that signal are output becomes quite long, which is a significant problem for many of the applications of this type of circuit. For example, in the case of an electronic musical instrument, for the individual operating such a musical instrument, any noticeable delay between the actions of the operator and the time at which the effect is produced in the musical output is clearly undesirable.

SUMMARY OF THE INVENTION

In consideration of the above, it is an object of the present invention to provide a signal processing integrated circuit for which when two or more of these circuits are cascade connected together, the delay stages in each circuit which are not directly involved with signal processing calculations do not exert a great effect on the time required for an input signal to traverse the cascaded circuits as a whole.

To achieve the above object, the signal processing integrated circuit of the present invention includes a serial delay means which is formed of multiple delay stages connected in series, each of which having a predetermined delay interval. A first input signal is supplied to the first delay stage of the above mentioned serial delay means, and a first output signal is output from a delay stage a predetermined number of delay stages prior to the final delay stage. Additionally, the signal processing integrated circuit of the present invention includes a first calculation means wherein predetermined calculations are carried out using the output of each delay stage of the above mentioned serial delay means. Furthermore, the signal processing integrated circuit of the present invention includes a second calculation means wherein predetermined calculations are carried out using the output of the above mentioned first calculation means and a second input signal, the result of the calculations then being output as a second output signal. With the signal processing integrated circuit of the present invention, the above mention first output signal is delayed by a time interval less than the total delay interval of the above mentioned serial delay means.

Moreover, when two or more signal processing integrated circuits of the present invention are cascade connected, for each adjacent pair of integrated circuits, if the first output signal of the first integrated circuit in the pair is supplied as the first input signal to the following integrated circuit, and if the second output signal of the following integrated circuit is supplied as the first input signal to the first integrated circuit of the pair, when a signal is input as the second input signal to the final integrated circuit in the cascade, an output signal from the cascade can be obtained after a very short delay, the delay bearing no relationship to the total number of delay stages in the cascade connected integrated circuits.

DETAILED DESCRIPTION OF THE PREFERRED EMBODIMENTS

Figure 1:
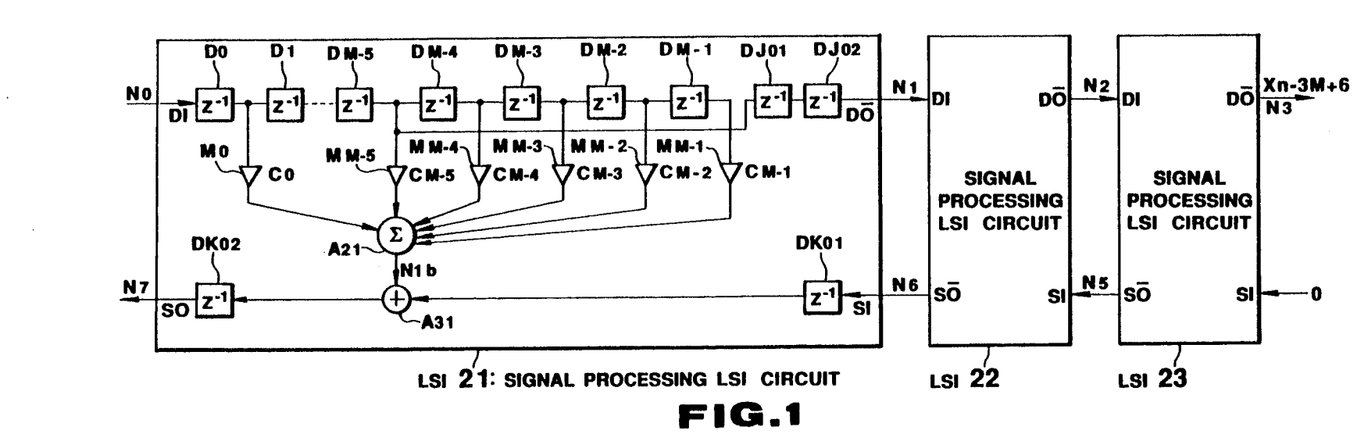
FIG. 1 is a block diagram of a calculation circuit employing a signal processing LSI integrated circuit of a first preferred embodiment of the present invention.

In the following, a first preferred embodiment of the present invention will be described with reference to FIGS. 1 and 2. FIG. 1 is a block diagram of a calculation circuit employing signal processing LSI integrated circuits LSI 21, LSI 22 and LSI 23 of present embodiment. Description of all elements in FIG. 1 corresponding to elements in the circuit of FIG. 3 previously described will be abbreviated and the elements will retain the original identifying numeral used in FIG. 3.

Just as with signal processing LSI integrated circuit LSI 11 shown in FIG. 3, in the signal processing LSI integrated circuit of the present embodiment, delayed signals for use in calculations are generated using M stages of serially connected delay circuits $D_0, D_1, \ldots D_{M-1}$. However, in the case of signal processing LSI integrated circuits LSI 21, LSI 22 and LSI 23 of present embodiment, the output of delay circuit $D_{M-5}$, which is four delay stages prior to the final delay stage, delay circuit $D_{M-1}$, is output as the first output signal via delay circuits $DJ_{01}$ and $DJ_{02}$. Accordingly, from input port DI up to delayed signal output port DO, the number of delay stages is given by M-2.

Furthermore, when two or more of the conventional signal processing LSI integrated circuits LSI 11 are cascade connected together as shown in FIG. 4, they are connected in such a way that the calculation result output port SO of one circuit is connected to the calculation result input port SI of the following circuit in the cascade, if it exists. In the case of signal processing LSI integrated circuits LSI 21, LSI 22 and LSI 23 of present embodiment as shown in FIG. 1, they are connected in such a way that the calculation result output port SO of one circuit is connected to the calculation result input port SI of the preceding circuit in the cascade, if it exists.

With signal processing LSI integrated circuit LSI 21 of present embodiment, a signal input at calculation result input port SI is delayed by a single sample interval $\tau$ in delay circuit $DK_{01}$, after which it is supplied to adder $A_{31}$. Also supplied to adder $A_{31}$ is the output of adder $A_{21}$ which is the sum of the results of multiplying the output of each delay circuit $D_0, D_1, \ldots D_{M-1}$ by a respective multiplication coefficient in multiplication circuits $M_0, M_1, \ldots M_{M-1}$. Thus, adder $A_{31}$ calculates the sum of the outputs of each delay circuit $D_0, D_1, \ldots D_{M-1}$ after multiplication of each by a respective multiplication coefficient and the input signal from calculation result input port SI delayed by a sample interval $\tau$. The result of the addition operation in adder $A_{31}$ is then supplied to calculation result output port SO via delay circuit $DK_{02}$. The internal structure of signal processing LSI integrated circuits LSI 22 and 23 is identical.

In the following, with reference to the time chart of FIG. 2, the operation of cascade connected signal processing LSI integrated circuits LSI 21, LSI 22 and LSI 23 of present embodiment as shown in FIG. 1 will be described. When a sample signal $X_n$ is supplied to input port DI (node $N_0$) of signal processing LSI integrated circuit LSI 21 at time $t_0$, the signal at delayed signal port DO (node 1) at time $t_0$ is sample signal $X_{n-M+2}$ which was input at input port DI (node $N_0$) at a point in time $(M-2)\tau$ earlier than time $t_0$. In the same way, because the sample signals output from signal processing LSI integrated circuits LSI 22 and LSI 23 at their respective delayed signal output ports DO (nodes $N_2$ and $N_3$ respectively) have traversed M-2 delay circuits in each of these integrated circuits, at time $t_0$, the signal at node $N_2$ is sample signal $X_{n-2M+4}$, and that at node $N_3$ is sample signal $X_{n-3M+6}$.

At time $t_0$, sample signals $X_{n-1}, x_{n-2}, \ldots X_{n-M}$ are output from delay circuits $D_0, D_1, \ldots D_{M-1}$, respectively, and their sum is determined in adder $A_{21}$. Accordingly, at time $t_0$, the signal value at node $N_{1b}$ is given by Equ. 6 below:

$$\sum_{k=0}^{M-1} C_k \cdot X_{n-k-1} \qquad \text{Equ. 6}$$

In signal processing LSI integrated circuit LSI 22, the signal output from input port DI (node $N_1$) is successively delayed in each delay circuit $D_M, D_{M+1}, \ldots D_{2M-1}$ by one sample interval $\tau$ each. At any give time, the output from any delay circuit $D_M, D_{M+1}, \ldots D_{2M-1}$ is equivalent to the input to the same delay circuit one sample interval $\tau$ earlier. Thus, because the input to signal processing LSI integrated circuit LSI 22 at time $t_0$ is sample signal $X_{n-M+2}$, the output from delay circuits $D_M, D_{M+1}, \ldots D_{2M-1}$ are sample signals $X_{n-M+1}, X_{n-M}, \ldots X_{n-2M+2}$, respectively, at time $t_0$. Therefore, the value of the signal present at node $N_{2b}$ at time $t_0$ as calculated in adder $A_{22}$ is given by Equ. 7 below:

$$\sum_{k=M}^{2M-1} C_k \cdot X_{n-k+1} \qquad \text{Equ. 7}$$

By the same reasoning, in signal processing LSI integrated circuit LSI 23, the signal output from delay circuits $D_{2M}, D_{2M+1}, \ldots D_{3M-1}$ are sample signals $X_{n-M+1}, X_{n-M}, \ldots X_{n-2M+2}$, respectively, at time $t_0$. Therefore, the result of the convolution calculation at time $t_0$ as calculated in adder $A_{23}$ is given by Equ. 8 below:

$$\sum_{k=2M}^{3M-1} C_k \cdot X_{n-k+3} \qquad \text{Equ. 8}$$

In the present embodiment, no signal is input at calculation result input port SI of signal processing LSI integrated circuit LSI 23. For that reason, the output from calculation result output port SO of signal processing LSI integrated circuit LSI 23 is equivalent to the result of the convolution calculation shown in Equ. 8 above delayed by one sampling interval $\tau$ in delay circuit $DK_{01}$. It can therefore be seen that at time $t_0$, the value of the signal at node $N_5$ which is supplied to calculation result input port SI of signal processing LSI integrated circuit LSI 22 is given by Equ. 9 below:

$$\sum_{k=2M}^{3M-1} C_k \cdot X_{n-k+2} \qquad \text{Equ. 9}$$

The convolution calculation obtained in Equ. 9 above which is supplied to calculation result input port SI of signal processing LSI integrated circuit LSI 22 is further delayed by one sampling interval $\tau$ in delay circuit $DK_{11}$, after which it is supplied to adder $A_{32}$. In adder $A_{32}$, the signal is then added to the result of the convolution calculations carried out in signal processing LSI integrated circuit LSI 22 as given by Equ. 7 above. Because of the result of the calculation of Equ. 7 at time $t_0$ is added in adder $A_{32}$ to the signal value that was at node $N_5$ one sampling interval $\tau$ earlier, the signal calculated in adder $A_{32}$ at time $t_0$ is given by Equ. 10 below:

$$\sum_{k=2M}^{3M-1} C_k \cdot X_{n-k+1} + \sum_{k=M}^{2M-1} C_k \cdot X_{n-k+1} = \sum_{k=M}^{3M-1} C_k \cdot X_{n-k+1} \qquad \text{Equ. 10}$$

The result of the above calculation in adder $A_{32}$ is output from calculation result output port SO of signal processing LSI integrated circuit LSI 22 after being delayed one sampling interval in delay circuit $DK_{11}$, after which it is supplied to calculation result input port SI of signal processing LSI integrated circuit LSI 21. Thus, at time $t_0$, the value of the signal at node $N_6$ is given by Equ. 11 below:

$$\sum_{k=M}^{3M-1} C_k \cdot X_{n-k} \qquad \text{Equ. 11}$$

The signal given by Equ. 11 above which is supplied to calculation result input port SI of signal processing LSI integrated circuit LSI 21 is further delayed by one sampling interval $\tau$ in delay circuit $DK_{01}$, after which it is supplied to adder $A_{31}$. In adder $A_{31}$, the signal is then added to the result of the convolution calculations carried out in signal processing LSI integrated circuit LSI 21 as given by Equ. 6 above. The result of this addition operation is then output from calculation result output port SO after being further delayed by one sampling interval $\tau$ in delay circuit $DK_{02}$. Thus, the value of the signal at node $N_7$ at time $t_0$ is given by Equ. 12 below:

$$\sum_{k=0}^{3M-1} C_k \cdot X_{n-k-2} \qquad \text{Equ. 12}$$

Figure 2:
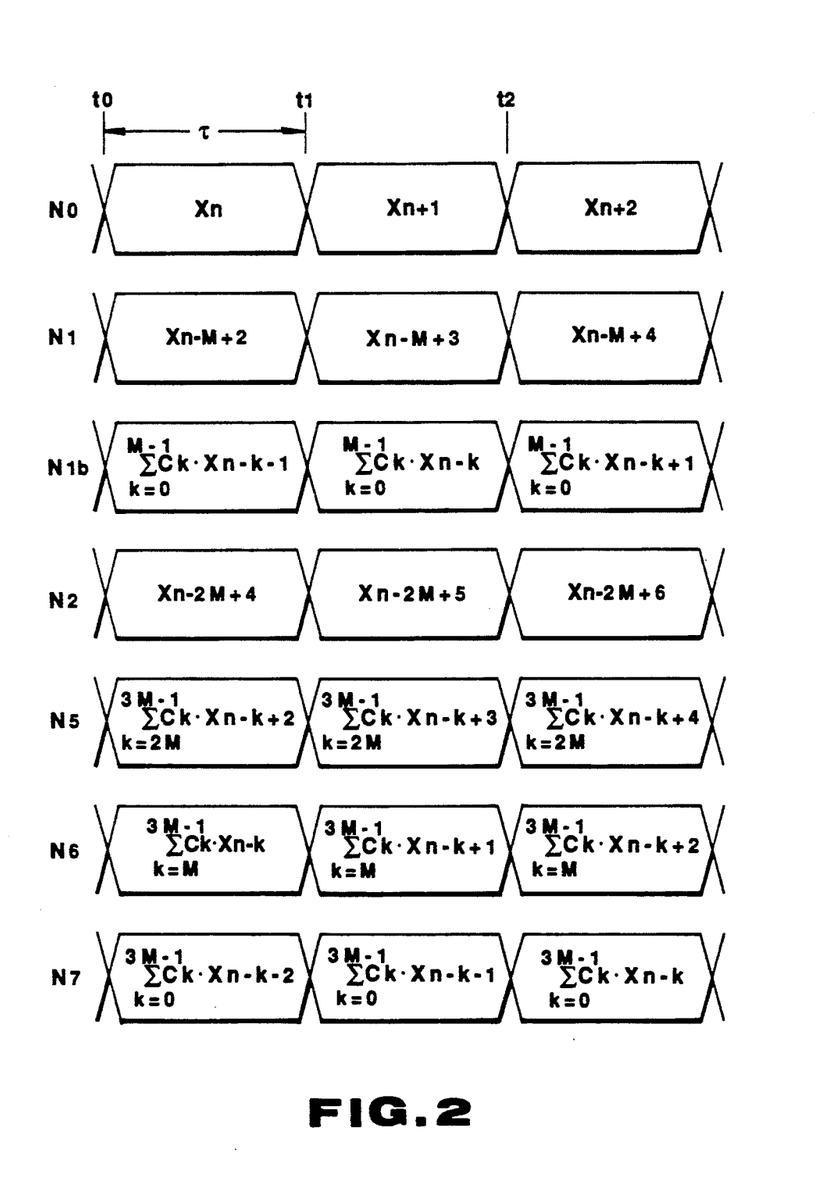
FIG. 2 is a time chart illustrating the operation of the signal processing LSI integrated circuit of the first preferred embodiment of the present invention.

As can be seen in FIG. 2, from time $t_0$ to time $t_2$ at which time two sampling intervals $\tau$ have passed, results of convolution calculations involving sample signals $X_n, X_{n+1}, \ldots X_{n-3M+1}$ are output. The convolution calculation circuit of the present embodiment is in no way limited to the arrangement shown in FIG. 1 in which three signal processing LSI integrated circuits are cascade connected together. Regardless of the total number of cascaded circuits, it is possible to limit the required time from when a sample is input to when the result of the convolution calculations are output to two sampling intervals $\tau$. The time interval of two sampling intervals τ is based on the amount of time lost in delay elements in signal processing LSI integrated circuits LSI 21, LSI 22 and LSI 23 which are not directly involved with convolution calculations. With the conventional convolution calculation circuit shown in FIG. 4, the time delay for the circuit as a whole is equal to the sum of the time lost in delay elements in each of signal processing LSI integrated circuits LSI 11, LSI 12 and LSI 13 which are not directly involved with convolution calculations. In contrast, with the convolution calculation circuit of the present invention shown in FIG. 1, the time delay for the circuit as a whole is limited only to time lost in delay elements in signal processing LSI integrated circuit LSI 21 which are not directly involved with convolution calculations. The reason for this will be described below.

When a sample signal is input at input port DI of signal processing LSI integrated circuit LSI 21, that signal is delayed only by an interval given by (M-2)τ before it is supplied to signal processing LSI integrated circuit LSI 22. Further, after only a time interval given by 2(M-2)τ has elapsed since the time of input, the signal is supplied to signal processing LSI integrated circuit LSI 23. In the case when four or more signal processing LSI integrated circuits are cascade connected together, the elapsed time from the time of input until when the input signal reaches the $L^{th}$ signal processing LSI integrated circuit is given by (L-1)(M-2)τ. Furthermore, the results of convolution calculations in signal processing LSI integrated circuit LSI 21 are delayed only by a single sampling interval τ (corresponding to the delay in delay circuit $DK_{01}$) before they are output at node $N_7$. The results of convolution calculations in signal processing LSI integrated circuit LSI 22 are delayed only by three sampling intervals τ (corresponding to the delay in delay circuits $DK_{01}$ and $DK_{02}$ and internal delay in signal processing LSI integrated circuit LSI 22) before they are output at node $N_7$, and the results of convolution calculations in signal processing LSI integrated circuit LSI 23 are delayed only by a five sampling intervals τ before they are output at node $N_7$. When L signal processing LSI integrated circuits are cascade connected together, a time interval given by (2L-1)τ is required for convolution calculations in the $L^{th}$ signal processing LSI integrated circuit to be output at node $N_7$.

For a convolution calculation circuit of the present embodiment having L signal processing LSI integrated circuits, when the transfer functions for the component signal processing LSI integrated circuits are given by $F_1(z)$, $F_2(z)$, ... and $F_L(z)$, the transfer function for the path from input port DI of signal processing LSI integrated circuit LSI 21 (node $N_0$) to calculation result output port SO of signal processing LSI integrated circuit LSI 21 (node $N_{(2L+1)}$) is given by Equ. 13 below:

$$F_1(z)z^{-1} + z^{-M}z^2F_2(z)z^{-3} + z^{-2M}z^4F_3(z)z^{-5} + \ldots + \quad \text{Equ. 13}$$
$$z^{-(L-1)M}z^{2(L-1)}F_L(z)z^{-2L+1} = F_1(z)z^{-1} + z^{-M}F_2(z)z^{-1} +$$
$$z^{-2M}F_3(z)z^{-1} + \ldots + z^{-(L-1)M}F_L(z)z^{-1}$$

In the above Equ. 13, delay elements $z^{-M}$, $z^{-2M}$, ..., $z^{-(L-1)M}$ represent delay elements which are indispensable for convolution calculations. As is clear from Equ. 13, because the total delay from node $N_0$ to node $N_{(2L-1)}$ caused by delay elements not directly involved in the convolution calculations is reduced, the factors before and after each $F_1(z)$, $F_2(z)$, ... $F_L(z)$ tend to cancel one another, leaving only $z^{-1}$ which represents those delay elements in the first stage which are not directly involved in the convolution calculations. Thus, because the time losses due to delay elements not directly involved in the convolution calculations from the time a sample signal is input up to the time when the convolution calculation results are obtained are independent of the number of cascade connected signal processing LSI integrated circuits, this loss factor is constant.

What is claimed is:

1. A signal processing integrated circuit for carrying out convolution calculations made up of a plurality of processing means for signal processing, each being cascade-connected to a preceding stage and a following stage processing means to thereby form at least two inner data paths each having a reverse flow direction, wherein each of the processing means comprises:
    (a) delay means having multiple delay stages in a first data path for delaying an information signal;
    (b) first calculation means for performing predetermined first calculations using the output of each delay stage of said serial delay means;
    (c) second calculation means connection to a second path for performing a second calculation using the output of said first calculation means and an output signal from the second path of the following stage processing means to the preceding stage processing means; and
    (d) second delay means in the second path for delaying the output signal from the second path of the following stage processing means wherein
    a) the first data path of each processing means produces a first output signal;
    b) the second path of each processing means has an input for receiving a second input signal and an output for providing a second output signal and the second signal applied to the input of the second path of the final stage processing means has a value of zero; and each processing means further comprises:
    c) output delay means for delaying the first output signal by a predetermined delay interval; and
    d) calculation signal delay means for delaying signals in the second path between the input of the second path and the second calculation means and between the second calculation means and the output of the second path by a total delay interval equal to the predetermined delay interval.

2. A signal processing circuit in accordance with claim 1 wherein said second calculation means of each processing means is such that the output of said first calculation means is added to the second signal received by the second path input of the same processing means.

3. A signal processing integrated circuit for carrying out convolution calculations, comprising a plurality of processing means for signal processing, said plurality of processing means including at least a first processing means end a second processing means, each processing means having a first data path and a second data path, a first data input connected to one end of the first data path, a first data output and a second data input and second data output each connected to a respective end of the second data path, the first data output of the first processing means being connected to the first data input of the second processing means and the second data input of the first processing means being connected to the second data output of the second processing means, wherein each said processing means comprises:
a) first delay means composed of a plurality of delay stages connected in series in said first data path for imparting successive time delays to information signals supplied to said first data input;
b) first calculation means for performing predetermined first calculations using the output of each delay stage of said first delay means to produce a first calculation result;
c) second delay means having an input connected at a point in said first data path between two of said delay stages of said first delay means and having an output connected to said first data output; and
d) second calculation means connected in said second data path for performing a second calculation using the first calculation result of said first calculation means and a signal conducted from said second data input to produce a second calculation result and to supply the second calculation result to said second data output.

4. A signal processing integrated circuit in accordance with claim 3 wherein each said processing means further comprises third delay means connected in said second data path and including a first delay element between said second data input and said second calculation means and a second delay element between said second calculation means and said second data output, the total delay interval produced by said third delay means being equal to the delay interval produced by said second delay means.

* * * * *